(12) United States Patent
 Berlin (10) Patent No.: US 11,099,281 B2
(45) Date of Patent: Aug. 24, 2021

(54) METHOD FOR DIRECTIONAL DISCRIMINATION OF PENETRATING CHARGED PARTICLES

(71) Applicant: Joseph Nathaniel Berlin, Coatesville, PA (US)

(72) Inventor: Joseph Nathaniel Berlin, Coatesville, PA (US)

(*) Notice: Subject to any disclaimer, the term of this patent is extended or adjusted under 35 U.S.C. 154(b) by 39 days.

(21) Appl. No.: 16/812,591

(22) Filed: Mar. 9, 2020

(65) Prior Publication Data

US 2020/0319353 A1     Oct. 8, 2020

Related U.S. Application Data

(62) Division of application No. 15/373,444, filed on Dec. 8, 2016, now Pat. No. 10,598,799.

(60) Provisional application No. 62/264,568, filed on Dec. 8, 2015.

(51) Int. Cl.
  *G01T 5/02* (2006.01)
  *G01T 1/20* (2006.01)
  *G01T 1/204* (2006.01)

(52) U.S. Cl.
  CPC .......... *G01T 1/2006* (2013.01); *G01T 1/2042* (2013.01); *G01T 5/02* (2013.01)

(58) Field of Classification Search
  CPC ................................ G01T 1/2042; G01T 5/02
  See application file for complete search history.

(56) References Cited

U.S. PATENT DOCUMENTS

| 3,049,619 A | 8/1962 | Genovese, Jr. |
| 3,140,394 A | 7/1964 | Roberts |
| 3,984,332 A | 10/1976 | Nelson et al. |
| 2008/0315091 A1 | 12/2008 | Morris et al. |

FOREIGN PATENT DOCUMENTS

WO     2014198644     12/2014

OTHER PUBLICATIONS

Barick et al.; An absolute measurement of Cherenkov emission by relativistic muons in pure water; Australian Journal of Physics; vol. 37; No. 5; pp. 567-574 (1984).
Agustsson et al.; A high resolution transverse diagnostic based on fiber optics, Proceedings of first International Particle Accelerator Conference; pp. 1203-1205 (2010).
(Continued)

*Primary Examiner* — David P Porta
*Assistant Examiner* — Shun Lee
(74) *Attorney, Agent, or Firm* — Ballard Spahr LLP (57) ABSTRACT

A method and device for measuring the magnetic rigidity of penetrating charged particles uses an elongated transparent ionizable medium, surrounded by a reflective interface, extending along a helical path around a longitudinal axis. A magnet applies a magnetic field to the medium in a direction along the longitudinal axis. A single luminosity proportional photon detector is operationally associated with the medium and adapted to generate signals indicative of the number of photons transiting the medium. A controller is adapted to receive the signals and calculate a penetration depth of the ionizing particle through the medium based on the number of photons transiting the medium and a magnetic rigidity of the charged particle based upon the penetration depth.

6 Claims, 4 Drawing Sheets

(56) References Cited

OTHER PUBLICATIONS

Burmistrov et al.; Test of full size Cherenkov detector for proton flux measurements, Nuclear Instruments and Methods in Physics Research A; vol. 787; pp. 173-175; (2014).
Tanaka, Hiroyuki K.M. et al.; Detecting a mass change inside a volcano by cosmic-ray muon radiography (muography): First results from measurements at Asama volcano, Japan; Geophysical Research Letters; vol. 36, _17302; 2009; pp. 1-4.
Fishbine, Brian; Muon Radiography, Detecting Nuclear Contraband; Lost Alamos Research Quarterly; Spring 2003; pp. 12-16.
Olive, K.A. et al; Passage of Particles Through Matter; Particle Data Group "The Review of Particle Physics"; 2014 Edition; Chapter 32; pp. 2-39.
Lazic, Fundamentals of Cherenkof fiber Calorimetry, in: Gougas et al. Ed., Proceedings of first International Four Seas Conference; pp. 86-89 (1997).
Mavromanolakis, Quartz Fiber Calorimetry and Calorimeters; HEP-Cavendish/04/34, UA-NPPS/06/2003; 33 pages; arXiv:physics/0412123v1 [physics.ins-det] (2004).
Riggi et al. GEANT4 simulation of plastic scintillator strips with embedded optical fibers for a prototype of tomographic system, Nuclear Instruments and Methods in Physics Research A vol. 624, No. 3; pp. 583-590 (2010).

METHOD FOR DIRECTIONAL DISCRIMINATION OF PENETRATING CHARGED PARTICLES

CROSS-REFERENCE TO RELATED APPLICATIONS

This application is a divisional of and claims priority to U.S. patent application Ser. No. 15/373,444, filed Dec. 8, 2016, which application is based upon and claims priority to U.S. Provisional Application No. 62/264,568, filed Dec. 8, 2015, all applications being hereby incorporated by reference herein.

FEDERALLY SPONSORED RESEARCH

The U.S. Government has rights in this invention pursuant to Federally Sponsored Research—NSF grant number PHY 08-55623.

FIELD OF THE INVENTION

The present invention relates to penetrating (relativistic) charged particles, those particles' energy deposition rates in matter, including ionization, Cherenkov, scintillation and braking radiations, photon counting, specular reflection of photons and the coincidence method of particle physics.

BACKGROUND

It is an object of the present invention to directionally discriminate penetrating charged particles (also called ionizing radiation), such as muons, electrons, positrons, protons, nuclei and ions. Existing methods in the prior art that achieve this object can be divided into two types:

1) Change-of-state chambers combined with a photoelectric effect, whereby the detection medium in devices such as the cloud chamber (Charles Wilson, 1936 Nobel Prize in Physics) and the bubble chamber (Donald Glaser, 1962 Nobel Prize in Physics) undergoes a change of state along the localized path of a penetrating charged particle. In the cloud chamber, the change of state in the detection medium is from vapor to liquid, whereas in the bubble chamber it is from liquid to vapor. These condensation paths are recorded photographically. Such devices were used in many basic particle physics discoveries in the early-mid $20^{th}$ century, such as the discovery of the muon.

For many decades, photographic methods were a primary tool of particle physicists.

Change-of-state chambers are used infrequently in modern science and industry in part because of the large uncertainty in response time due to the stochastic nature of molecular condensation/vaporization, and in part because of the precise temperature and pressure requirements of the reaction chambers. For most applications, such devices have been outclassed by the second existing method for the task at hand, namely:

2) The coincidence method (Walter Bothe, 1954 Nobel Prize in Physics), in which the temporal coincidence of multiple detectors, combined with the known spatial relationship of the detectors, is used to reconstruct a particle path. The more numerous, densely packed and fast-response the detectors, the more directional discrimination a coincidence array can achieve, in principle. The coincidence method is a fundamental tool in experimental physics and enjoys a near-monopoly of this task in science and industry, largely due to the method's affinity with digital electronics.

In the coincidence method, a time window is chosen for two given detectors. If a particle is detected in one detector, a timer is started (the time window is opened). If the other detector produces a detection within that time window (before the timer runs out), then a coincidence output signal is produced. The speed of the particle and the spatial relationship between the two detectors serve to 'set' the minimum time window for a coincidence event caused by a single particle passing through both detectors.

There is a diverse field of detector types used in the employ of the coincidence method, from transparent scintillation or Cherenkov volumes optically coupled to one of any number of photodetectors, to spark chambers, to wire chambers, resistive plate chambers, drift chambers, Geiger-Muller tubes (the first historical application of the coincidence method), and others. A seminal coincidence method patent is U.S. Pat. No. 3,140,394 A, issued to Arthur Roberts in 1964. The one common trait in all of these devices is that the directional measurement arises from the temporal relationship of two or more signals originating from two or more detectors. This is a fundamental limitation and function of the coincidence method: it requires at least two detectors, firing in near-synchrony.

Therefore, the first disadvantage to note about the coincidence method is that a single detector of any existing type will not produce a directional discrimination: two or more detectors are always required in the coincidence method.

The second disadvantage of the coincidence method is that some method or means for the comparison of the timing of the two signals is required, such as Rossi's seminal circuit (1945). This can be costly, especially if very fine directional resolution is sought (requiring very fast detectors).

The third, more persistent, disadvantage of the coincidence method is that the method is prone to experiencing false positive signals caused by two or more particles impinging detectors within the temporal-coincidence time-window and thus mimicking the particle track of a single particle. These false positive signals are called accidental coincidences and can create significant noise or eclipse single-particle signal altogether.

Accidental coincidences are the nemesis of the coincidence method and require that the readout of the detectors be fast enough (have a small enough time resolution) to discriminate between a single-particle event (a true coincidence) and a two-or-more-particle event (an accidental coincidence). The ambient particle flux of the operating environment is therefore a primary concern for the coincidence method.

Because penetrating ionizing radiation is pervasive on Earth (from cosmic ray air showers and terrestrial radiation), and because these particles travel at relativistic speeds, coincidence detectors have to be fast to be reliable. This means that the detectors require nanosecond resolution or better for meter-scale coincidence arrays. This brings costs and other disadvantages to the coincidence method.

The need to outrun accidental coincidences has been a major driver of the development of ever-faster-response particle-detectors and photo-detectors, for use in coincidence arrays of many kinds. As compared to slow-response detectors, the faster-response detectors used in the coincidence method have the following general disadvantages:

a) Fast-response detectors are more expensive than slow-response detectors. Consider the cost of a (fast) PMT versus an equivalent detecting area of one or more (slow) photodiodes or CCDs. Slower-response detectors will remain less expensive than faster-response detectors for the foreseeable future, even as faster detector technologies develop.
  b) Fast-response detectors require fast data acquisition, which is costlier than the slow data acquisition required by slow-response detectors.
  c) Fast-response detectors are typically less robust in the face of physical stress than slow-response detectors.
  d) Fast-response detectors typically require greater calibration and suffer greater hysteresis than slow-response detectors, and consequently accumulate noise signal faster over their lifetimes.

But even if the detectors used in the coincidence method were to have instantaneous response times, ambiguity would still remains about whether a coincidence signal was caused by one particle or by more than one particle (an accidental coincidence). This is because a basic feature of the coincidence method is that the particle is not "accounted for" between the physical volumes occupied by the two or more detectors: it was extrapolated to have existed in that space. This is a basic limitation of the coincidence method, and a factor that is in stark opposition to the operation of the novel means described herein. The novel means described herein can be described, in contrast, as a continuous method of particle path detection that cannot be "fooled" by conventional accidental coincidences.

It is a further object of this invention to energetically discriminate penetrating charged particles. There are several methods in the prior art to achieve this, discussed below.

The first prior art method for energy discrimination of penetrating charged particles, as utilized in patent above U.S. Pat. No. 3,049,619 A, is to discriminate the opening angle of a Cherenkov light-cone in a dielectric medium in order to determine the energy (momentum) of the incident charged particle. This is achieved by virtue of the fact that the opening angle of a Cherenkov light-cone is directly proportional to the velocity of the penetrating charged particle. This prior art method is unrelated to the novel means described herein and is included for context and as an attempt at completeness.

The second, more pervasive, method for energy discrimination of penetrating charged particles is what can be called the magnetic deflection method, whereby a charged particle passes through a produced magnetic field, and a departure from a straight-line path is exhibited by the particle, which follows the magnetic-geodesic curve dictated by its magnetic rigidity (i.e. a convolution of its charge and momentum) and the strength of the magnetic field applied. There exist only two ways of measuring the curvature of this magnetic-geodesic path in the prior art, namely the aforementioned coincidence method and the aforementioned photographic method, which have their concomitant disadvantages which have been already enumerated.

The novel means described herein uses a unique directional discrimination capability in the service of a modified magnetic deflection method to achieve energy discrimination that relies on neither the coincidence method nor the photographic method.

A topically similar (but substantially different) device for detecting the presence, but not the directional or energetic discrimination, of penetrating charged particles is described in U.S. Pat. No. 3,984,332 A. In that patent a fiber optic (which is, essentially, a one-dimensionally elongated dielectric surrounded by a specular reflector) is used as a Cherenkov-producing medium and transmission line, all-in-one. Discussed therein is the feature of fiber optics that only photons traveling with an angle sufficiently parallel the longitudinal axis of the fiber optic experience complete internal reflection and thus transmission. Fiber optics can transmit light from the part of a Cherenkov light-cone produced therein only if it lies within the critical angle of the fiber optic, as necessitated by the limitations of the fiber optic transmission. Therefore, it could be stated, though it is not done so in U.S. Pat. No. 3,984,332 A, that only those penetrating charged particles that impinge the fiber optic at an angle (in relation to the fiber's longitudinal axis) that corresponds to the sum of opening angle of the Cherenkov cone (typically about 45 degrees)±the acceptance angle of the fiber optic will definitely have the potential to produce some photons that transmit. This does not translate, however, into anything besides a directional limitation (either the photons can transmit or they can't) on the purely binary signal that travels down the fiber optic, identifying the existence of some particle at some time. This feature is a relic of fiber optics, and seems to be viewed by the author of U.S. Pat. No. 3,984,332 A as a limitation, only.

Further, regarding U.S. Pat. No. 3,984,332 A, no directional or energetic discrimination is described as derived from the interaction between the fiber optic and a penetrating charged particle. Further, no discrimination of the number of photons produced is described. Rather, the timing of the light flashes is used in a conventional coincidence method, which suffers from the all of the same disadvantages described above.

SUMMARY

The present invention, the subject of this patent application namely "Directional Luminosity Discrimination" (or "DLD"), is a novel, useful and unobvious method for the directional discrimination, and thereby energetic discrimination, of penetrating charged particles.

The present invention may be described as a method or machine which the counts the number of photons produced by the passage of a penetrating charged particle through an elongated dielectric medium, resulting in a directional measurement of said charged particle by way of photon counting (that is, by a luminosity measurement alone).

In a nutshell, the event captured by the present invention goes as follows: a penetrating charged particle passes through an elongated dielectric medium, producing photons through electromagnetic interaction with the medium (the medium is transparent to the photons produced in this manner). For some particle populations, the number of photons created in this manner is directly proportional to the penetration depth of the charged particle through the medium. This invention counts the photons created in such an event, thereby deducing the penetration depth of that particle (it does this by internally, specularly reflecting those photons within the dielectric medium, causing their passive migration down the length of the dielectric medium to a means for their counting). This deduced penetration depth is then 'fitted' inside of the known geometric dimensions of the elongated dielectric medium, so as to find the set of possible trajectories that would create such a penetration depth, and therefore such a photon count. In this way, photon count is converted into a measure of the zenith deviance from the longitudinal axis of the elongated dielectric medium, with accompanying directional ambiguities which are discussed in the section Signal Interpretation. In an improvement, energetic measurement of the penetrating charged particle may be achieved by the application of conventional magnetic-deflection (rigidity) energy discrimination methods in conjunction with a modified geometry of the elongated dielectric medium.

A Directional Luminosity Discriminator (DLD) consists of the following components:

1) The column [1]: A substantially one-dimensional (i.e. columnar or rod-like), transparent, dielectric medium, which undergoes the impingement of penetrating charged particles, said charged particles producing one or more types of electromagnetic radiation due to their passage though the column [1].

2) The reflector Pt A means for the production of the specular reflection of photons, which surrounds and is coupled to the outside of the column [1], which produces the internal reflection, and thereby passive migration, of said electromagnetic radiation (photons) created by the passage of a penetrating charged particle through the column [1], 3) The photon counter [3]: A means for the counting of the number of photons created by the penetration of said charged particle through the column [1], such as a luminosity-proportional photodetector which is optically coupled on the column [1] (typically, though not necessarily, on one end of the column [1]), whereby the detector [3] receives the photons created by the passage of a penetrating particle, after their inevitable migration down the column via internal specular reflection.

Note: Luminosity-proportional, here, denotes that the output of the photodetector is a calibrated monotonic function of the number of photons impinging the photodetector, i.e. it denotes a monotonic gain function for the photodetector. Photomultiplier Tubes, Photodiodes, phototransistors, CCD pixels and other photodetectors are luminosity-proportional. The temporal-response characteristic of the photodetector is explicitly not of primary importance in the function of DLD; the photon-counting characteristic is of primary importance.

4) The light baffle [4]: A means for the production of the exclusion of exterior light from the operating region of [1], [2] and [3] whereby the components [1], [2] and [3] can operate "in the dark". This may be achieved as an effect of other components, but this darkness is a functional requirement nonetheless.

5) The photon-count to penetration-depth equivalency means [5]: A means for the conversion or equation of the photon count produced by the photon counter [3] into a determination of the penetration depth (i.e. path-length) of the charged particle through the column [1], such as by the application of a known ionization energy loss rate which is appropriate for the incident particle and for the dielectric medium (such as the Bethe stopping power equation for charged particles [FIG. 2]).

6) The geometric-fitting means [6]: A means for the conversion or equation of the penetration depth into a determination of the angular (zenith) deviance of the penetrating charged particle from the longitudinal axis of the column [1]. This is achieved by fitting the deduced penetration depth fully within the known geometry of the column [1], with the ends of the penetration depth terminating on the surface of the column [1]. Geometric degeneracies exists in signal interpretation in this step, due to the non-uniqueness of solutions to the geometric fit. This degeneracy is discussed in the section Signal Interpretation.

The invention concerns a device for measuring the magnetic rigidity of penetrating charged particles. In an example embodiment the device comprises an elongate transparent ionizable medium, a magnet, a single luminosity proportional photon detector, and a controller. The elongate transparent ionizable medium extends along a helical path around a longitudinal axis, and is surrounded by a reflective interface. The magnet is adapted to apply a magnetic field to the medium in a direction along the longitudinal axis. The single luminosity proportional photon detector is operationally associated with the medium and is adapted to generate signals indicative of a number of photons transiting the medium. The controller is adapted to receive the signals and calculate a penetration depth of the ionizing particle through the medium based upon the number of photons transiting the medium and a magnetic rigidity of the charged particle based upon the penetration depth.

As an example, the ionizable medium comprises distilled water. In an example, the ionizable medium is contained within a helical tube.

As an example the tube is flexible. In an example, the medium comprises a fiber optic scintillator.

This invention further encompasses a method for measuring the magnetic rigidity of penetrating charged particles. In an example embodiment, the method comprises:

providing an elongate transparent ionizable medium extending along a helical path around a longitudinal axis, the medium being surrounded by a reflective interface;

applying a magnetic field to the medium in a direction along said longitudinal axis;

providing a single luminosity proportional photon detector operationally associated with the medium and adapted to generate signals indicative of a number of photons transiting the medium;

providing a controller adapted to receive the signals;

allowing an ionizing particle to pass through the medium, thereby creating photons therein, the photons transiting the medium;

counting the number of photons transiting the medium using only the single photon detector, the single photon detector generating the signals indicative of the number of photons transiting the medium;

calculating a penetration depth of the ionizing particle through the medium based upon the number of photons transiting the medium using the controller; and calculating, in the absence of temporal coincidence, a magnetic rigidity of the charged particle based upon the penetration depth using the controller.

DETAILED DESCRIPTION

The function of the present invention can be described as, firstly, containing a portion of the track of a penetrating charged particle (such as, but not limited to, relativistic $\mu^{\pm}$, $\pi^{\pm}$, protons, ions or nucleons, and even monochromatic relativistic e and others) within a substantial portion of the column [1] and, secondly, by the counting the number of photons produced through the interaction of that charged particle and the medium of the column [1]. This photon count (light-yield) is related to the penetration depth of the charged particle. The relationship is complex one, but for a wide range of energies, energetic losses of the charged particles through the medium are directly proportional to the penetration depth through the column [1]. The one-dimensionality of the column [1] allows for a deduction of the arrival direction (or, the zenith-deviance) of the charged particle by fitting the path-length, deduced from the photon count, within the highly one-dimensional column's [1] geometry.

Figure 1:
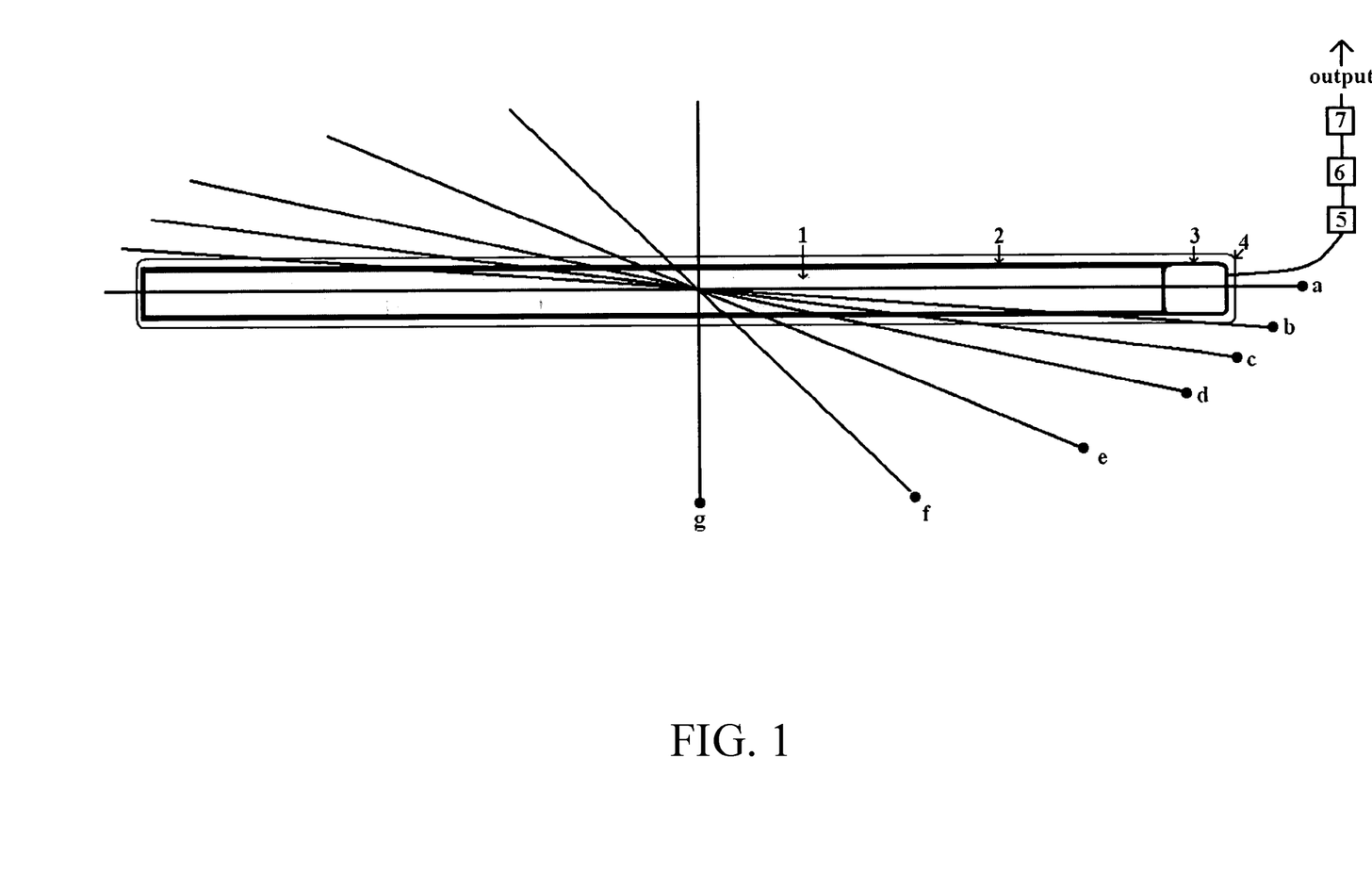
FIG. 1 is a schematic representation of an example embodiment of a dielectric column and associated instrumentation according to the invention.
Figure 2:
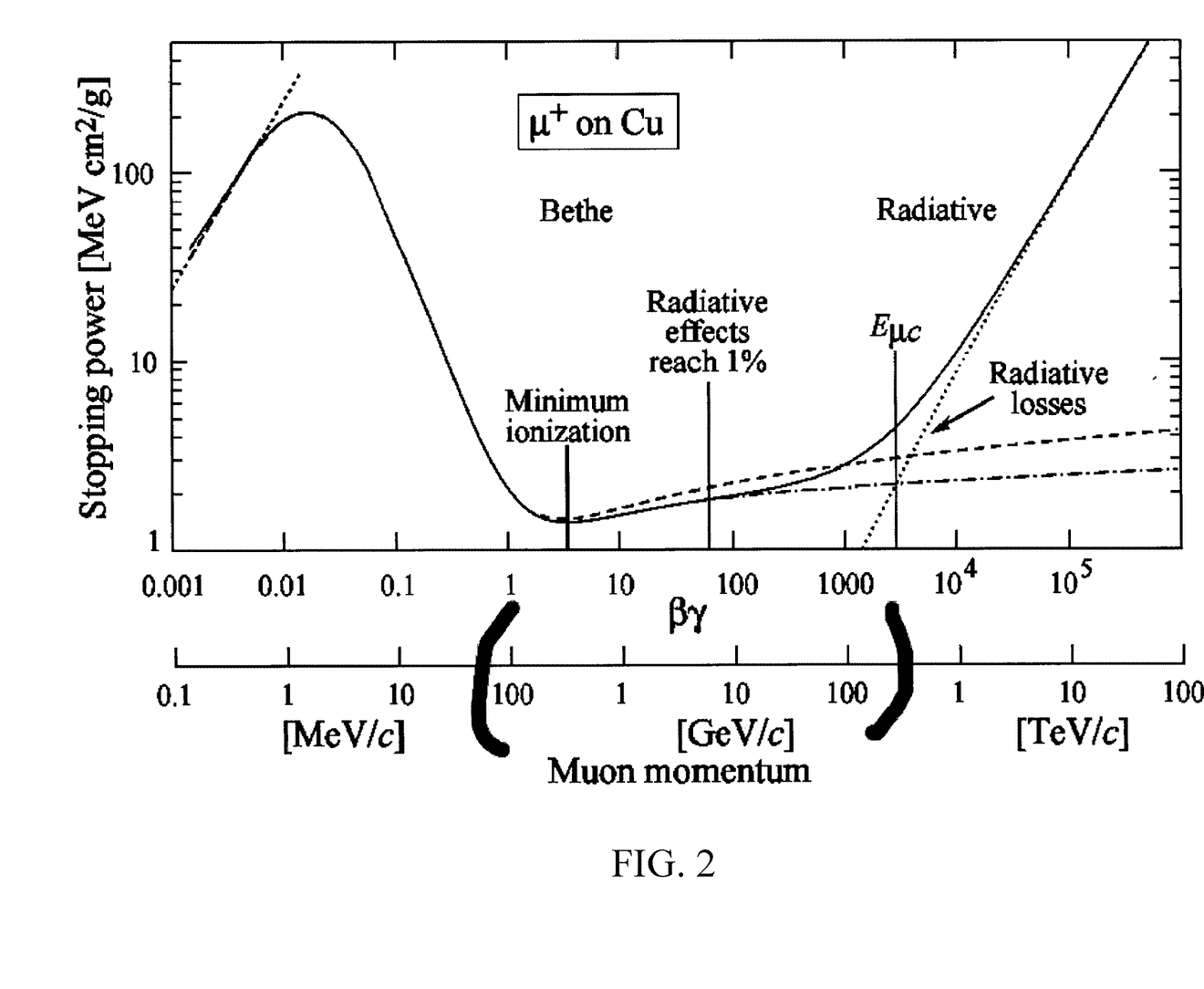
FIG. 2 is a chart showing stopping power for relativistic muons in copper.
Figure 3:
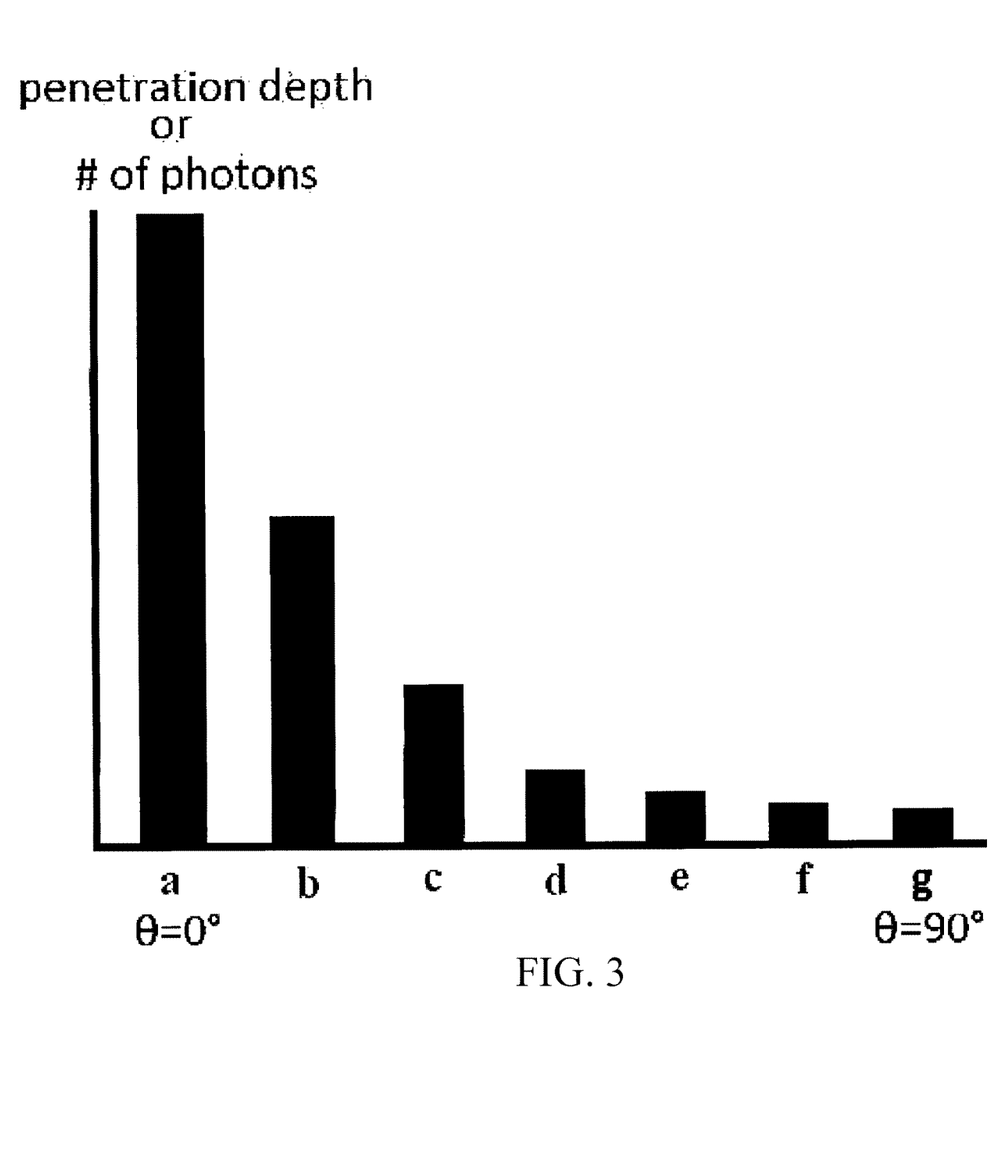
FIG. 3 is a bar graph illustrating particle penetration depth of a dielectric column along trajectories shown in FIG. 1.

Seven example charged particles, with differing values of Θ, are shown as A→G in FIG. 2 above, which also shows a model of the simplest form of the present novel means. As a penetrating charged particle passes through the column [1], it produces photons by one or more of the following mechanisms:

1) Ionization (e.g. Cherenkov radiation)
2) Luminescence (e.g. scintillation radiation)
3) Braking radiation (bremsstrahlung)
4) Any other macroscopically-continuous radiation derived, directly or indirectly, from the energy of the charged particle, as long as the trajectory of the particle is not substantially altered by such radiation.

The photons produced in this manner travel through the transparent column [1] and reflect against the surrounding specular reflector [2] once or many times (or not at all, for the rare photon radiated parallel to the column). A substantial portion of the photons will thus migrate down the column [1] and reach the photon counter which is coupled to the column [1] (typically, though not necessarily, affixed at the end of the column [1]).

The photon counter [3] has to be sensitive to the number of photons produced (the luminosity of an event), so photodetectors employed by the present invention must be luminosity-proportional, i.e. the output of the photodetector must be a calibrated monotonic function of the luminosity (photon count) impinging the photodetector. Photomultiplier Tubes, Photodiodes, phototransistors, CCD pixels and other photodetectors are luminosity-proportional. Any of these photodetectors, used in conjunction with an electronic circuit of some kind, can produce a photon count of the charged particle penetration event. The output of the photon counter [3] is the photon count.

The photon count is converted, or equated, to a penetration depth of the charged particle through the column [1] by a second means [5], namely by the application of the particle's appropriate energy-loss-rate curve through the medium that comprises the column [1] and knowledge of assumption of the energy and species of the charged particle. The output of the second means [5] is the penetration depth.

The penetration depth is converted, or equated, to a zenith deviance (Θ) of the charged particle from the pointing direction of the column [1] by a third means [6], namely by geometry, specifically by the geometric condition requiring that a line representing the penetration depth be contained within the column [1], with both ends of that line terminating on the surface of the column [1]. This deduction of zenith deviance from penetration depth is accompanied by azimuthal, polar, and other geometric ambiguity/degeneracy (see section entitled Signal Interpretation).

The bracketed energy-region in FIG. 2 is the so-called "minimum-ionizing" energy region. A penetrating charged particle in this energy range loses energy to the dielectric medium at a nearly constant (and minimal) rate, creating photons as a result. The number of photons created by the passage of a penetrating charged particle, of minimum-ionizing energy, is directly proportional to the penetration depth of the charged particle through the medium, because the energy carried away by each photon is, on average, constant while in this energy region. For this reason, particles of the "minimum-ionizing" energy region energy region are extremely prevalent in high-energy particle physics processes in nature and in laboratories.

Polychromatic sources of penetrating charged particles of very high-energy (in FIG. 2, particles with energies in the TeV range or greater) will exhibit a coalescence of the loss-rates for each particles as each loses energy to the dielectric medium at a higher rate until reaching the minimally-ionizing energy, where it finds smooth sailing for a (comparatively) long period of time (it will have to lose 99.9% of its energy through minimal-ionization before it grinds to a halt due to low-speeds processes).

Penetrating charged particles that have energies within the minimally-ionizing energy region (circled in FIG. 2), are envisioned as excellent candidates for detection by the novel means described herein (note that electrons and positrons are not modeled the same way.

Penetrating charged particles with energies greater than their minimum-ionizing energies (and even $e^{\pm}$ of any energy, a different energy-loss rate function) can be accommodated by the present invention if the source of these particles is monochromatic or comprised of only a few fixed energies. In such a situation, the non-linear relationship between penetration depth and number of photons produced can be accounted for and directional discrimination can be achieved in such a case.

A fundamental advantage of one or more aspects of the present invention is that the precise timing of the event is not necessary for the directional discrimination of the charged particle. This is a fundamental advantage of the present invention over the coincidence method as described in Prior Art. The particle's trajectory, in relation to the pointing direction of the column, is encoded into the light-yield (photon count) of the event by virtue of the one-dimensionality of the column and the light-yield's dependence on the penetration depth of the particle through the dielectric column.

The application of the conventional coincidence method to a plurality of instances of the present invention can remove azimuthal, polar and other degeneracies in signal interpretation while maintaining many advantages over other detector technologies.

The above-mentioned and additional objects, advantages, and applications of the invention and a further understanding of the invention will be apparent after consideration of the following description of a signal interpretation of the device, and an embodiment described in conjunction with the accompanying drawing.

Signal Interpretation

The angle at which the penetrating charged particle interacts the column [1] determines the maximum possible number of photons created in the event. The general form of the relationship between angle of incidence Θ and luminosity of the event is:

$$\text{Photon Count}(0 < \Theta < \pi/2) = F(e)\cot(\Theta) + \text{constant} \quad \text{Eq. 1)}$$

For particles that are minimum-ionizing particles, energy losses (number of photons produced per unit depth) are effectively energy-independent and the function F(e), which is energy dependent, is reduced to a constant, K and can be ignored in the proportionality. Photon count is maximized when the particle track is on-axis ($\theta=0$) and is minimized when the particle track is orthogonal to the column's longitudinal axis ($\theta=\pi/2$). The constant term in Eq. 1 comes from the non-zero luminosity of events with $\theta=\pi/2$ (track lengths equal to column diameter).

Now, for minimum-ionizing particles (bracketed region of FIG. 2), F(e) is approximately constant, so we can approximate F(e) as a constant K. This significantly simplifies the task.

$$\text{Photon Count}(0<\theta<\pi/2)=K\cot(\theta)+\text{constant (for minimum-ionizing particles)} \quad \text{Eq. 2}$$

The luminosity discrimination method utilized by the present invention reveals the particle's path-length (penetration depth) through the column [1]. For equivalent particles, identical path-lengths are identically luminous (i.e. they have the same photon counts, or light yields, within quantum statistical deviations arising from Landau energy deposition uncertainty (which "wash out" to a constant rate at macroscopic scales). However, different arrival directions can produce identical path-lengths (penetration depths) through the column [1], and therefore so-called geometric luminosity degeneracy exists in the interpretation of the zenith-deviance ($\Theta$).

Several types of geometric luminosity degeneracy exist for a single instance of the present invention, herein referred to as Directional Luminosity Discriminators, or DLDs, and are discussed below. Note that multiple DLDs analyzed in temporal coincidence mode can remove these degeneracies/ambiguities in directional discrimination.

Up vs. Down Luminosity Degeneracy:

A particle traveling up the column (away from the photodetector) at some zenith-deviance ($\Theta$) is just as luminous as a particle traveling down the column at a vertically-mirrored declination; i.e. there are two interpretations for all events ($\Theta$ and $180°-\Theta$). most ionizing particle fluxes are directional, so one interpretation (the "upcoming" particle) can sometimes be ignored. Light-absorbing features at one end of the column [1] as well as arrays of a plurality of DLDs can remove this and other geometric luminosity degeneracies (see Embodiments).

Column-Clipping Luminosity Degeneracy:

Column-Clipping events are a source of false negatives. Any inclined particle entering the column off-center will intersect the column in a chord instead of a full column diameter. Such an event is said to be a clipped event. Consequently, a small signal may have been a clipped event of a potentially larger luminosity.

Column-clipping produces false negatives, which allows us to justifiably approximate particles as on-center (and not corner-clipping) at a loss of detection efficiency.

Azimuthal Luminosity Degeneracy:

At some off-axis differential threshold for minimum output magnitude cut, the signal interpretation of a single DLD exhibits Azimuthal luminosity degeneracy. That is, if two particles travel through the ionizable column with the same zenith declination but from two different azimuthal declinations, they will produce the same number of photons, on average, because their path-lengths will be identical. A single instance of the present invention therefore cannot isolate a single, non-degenerate trajectory for the penetrating charged particle if the penetration depth is shorter than the full length of the column (i.e. if the charged particle enters at an off-axis angle).

The preceding luminosity (photon count) degeneracies or ambiguities have applied only to off-axis events (which are, of course, the vast majority of the proportion of signals from an isotropic particle flux, for example).

Now, consider the comparatively rare but desired and important case where a particle enters the column through the top of the column and exits through the bottom of the column, i.e. the on-axis event. In this case, the signal has no alternative interpretation; an on-axis path cannot be rotated azimuthally (except within the maximal angular resolution of the column) nor raised nor lowered along the column's height. An on-axis event is azimuthally non-degenerate, unambiguous. Consequently, in such a case, the present invention achieves complete single-particle angular discrimination using a single photodetector.

Because no coincidence is required (only one detector is employed), a single DLD is impervious to conventional accidental coincidences. This is a fundamental advantage of DLD over existing directionally-sensitive particle detectors, as previously described.

Instead of merely detecting the existence of a particle in two or more locations and deducing from their locations and timing a particle path joining them (the coincidence method), DLD can detect the in-column penetration depth from the photon count, and therefore has a continuous measurement of the particle, instead of a discrete one.

However, multiple off-axis particles passing through the radiator column within the time resolution of the photodetector will produce excess, uncorrelated light and confuse event reconstruction. This is mitigated by decreasing ambient flux through shielding, increasing the timing resolution of the photodetector, using redundant DLD's in temporal coincidence mode, and (importantly) by further elongating the column (1), increasing the ratio between on-axis and off-axis signal.

Multiple-Particle luminosity degeneracy contributes far less noise to DLD than is eliminated by its imperviousness to conventional accidental coincidences. However, it does set a minimum limit for the response time of photodetectors used in DLD. This response speed requirement is far less stringent than that required in the conventional coincidence method.

The first main consideration for the directional discrimination ability of a specific DLD is the efficiency of the specular reflector [2]. A less-efficient specular reflector [2] will, over the many reflections required to produce the migration of photons down the length of the column [1], absorb some or all photons reflecting this way, effectively reducing the aspect ratio of the column [1]. In the limit of perfect efficiency for the specular reflectors [2], all photons reach the photon counter [3[ ] regardless of their point of creation and number of reflections; one may utilize the full length of the column [1] as a detection medium for the DLD.

The second main consideration for the directional discrimination ability of a specific DLD is the Height to Width ratio of the column [1], or the aspect ratio of the column [1]. A higher aspect ratio means a narrower column [1], which corresponds to increased directional discrimination capability within a narrower, more restricted aperture (which exists along the longitudinal axis of the column [1]). A lower aspect ratio means a squatter column, less elongated, which correspond to a decreased directional discrimination capability within a wider, less-restricted 'aperture'.

EMBODIMENTS

The parameters of these embodiments are illustrative, and are not therefore to be taken as a. limit upon the invention. Persons skilled in the art will be aided by the teachings herein to adapt the principles of this invention to other embodiments. The scope of the protection afforded should therefore be limited only by the appended claims.

Embodiment 1

This first embodiment has a column (1) made of distilled water which is contained in a heavy-duty PVC pipe and has dimensions of 72 inches long and 3 inches diameter. The reflector (2) is made of an EMI-reflective sheet (CADPAK ESD-EMI Static Shield Barrier MIL-PRF-81705 Type 1 Class 1) which lines the interior of the pipe. The photon counter (3) is a 2" ElectronTube PhotoMultiplier Tube (Model Number 9266B) which is optically coupled the water column through a UV-transparent PVC window at one end of the pipe. The light baffle (4) is PolyVinyl Fluoride (Tedlar) sheeting. A discrimination of the output of the PMT is achieved by a LeCroy Oscilloscope, using its internal amplitude-measuring circuits, thereby discriminating photon count. The theoretical means (5) is the application of Bethe-Bloch stopping power plot (prompted by a well-founded assumption that the particle population is dominated by minimum-ionizing particles). The geometric fitting means (6) is the geometric requirement that the deduced path-length delivered by the theoretical means (6) must fit snugly within the confines of the elongated column (1).

This embodiment was built as a proof-of-concept prototype while the inventor was a Research Assistant in the Physics Department at PSU in 2013. The prototype was tested in a lab with considerable overburden, which caused a screening out of low-energy, non-minimum-ionizing particles. In order to test the prototype, a zenith scan the sky was performed by taking long exposures of self-triggered events with the prototype tilted to varying zenith declinations. The purpose was to isolate the large signals from such a survey (that is, make the same stringent amplitude cut for each survey, a posteriori). The hypothesis was that those large signals (with large photon counts) must typically represent particles that travel nearly parallel to the longitudinal axis of the column (1). Thereby, a flux measurement at each zenith inclination was achieved (in hypothesis) by ignoring all but the larges signals, and noting the rate. A comparison of this experimentally-achieved Directional Luminosity Discrimination data with the known dependence of atmospheric ionizing particle flux on zenith angle demonstrated that the basic hypothesis underlying DLD is sound: penetration depth, and thereby angular deviation of the particle path from the longitudinal axis of the column, can be deduced by photon counting.

Embodiment 2

In this embodiment, the column [1] is made of fused silica scintillator with a very high aspect ratio (height to width), and the photon counter [3] is a photodiode which is affixed to one end of the column [1]. The NP juncture of the photodiode acts as a high-pass filter for photon counting, that is if enough photons are produced in the column, the photodiode will reach its tripping voltage and provide a digital output signal. The tripping voltage of the photodiode is chosen so as to be reached only when a desired number of photons are produced in the column and impinge the detector, such as 80% of the expected photon count of an event with a penetration depth equal to the length of the longitudinal axis of the column [1].

Embodiment 3

In this embodiment, a plurality of columns are etched into a block of reflective material, such as aluminum, then filled with a dielectric fluid and terminated, on one end, with a single CCD pixel. The output of each CCD is read into a multi-channel data acquisition device, where Directional Luminosity Discrimination is achieved independently on each channel and where temporal coincidence discriminations are made between the pixels by the conventional coincidence method. Together, a less directionally ambiguous picture of the arrival direction of the penetrating charged particles is recovered, even those particles which do not impinge any column directly parallel (on-axis).

Each column produces an independent directional measurement of a particle that passes through it. The more on-axis the particle becomes, the more photons are produced in the column and the fewer contiguous pixels in the array fire in temporal coincidence.

The temporal resolution of the multi-channel data acquisition device (that is, the coincidence time window) need not be so fast as to outrun signal caused by all uncorrelated particles (as is the case with the conventional coincidence method), but rather it need only be fast enough to outrun the comparatively rarer near-axis and on-axis signal in each channel. Therefore comparatively slower (millisecond to microsecond time resolution) CCDs may be used in this and other embodiments, bringing significant cost and performance advantages over the prior art.

Embodiment 4

In this embodiment, two coincidence arrays, each like that described in Embodiment 3, are placed on either side of a subject, and tomography, such as muon tomography, is achieved by the comparison of temporally correlated particle trajectories in both arrays and by the application of the laws of coulomb scattering in the subject material. If a muon, for example, is detected entering the subject via the first array with a trajectory independently determined by as few as a single DLD in that array, it should be seen exiting the subject on the opposite side with the same trajectory, in the absence of coulomb scattering. A large deviation in angle indicates a large-angle Coulomb scattering event in the subject, which indicates the presence of a high-z material. In this way, a three-dimensional density map can be created for a subject using this technique and naturally abundant atmospheric muons.

Muon tomography is rapidly developing for geological and metrological applications, including the scanning of cargoes for high-z material associated with nuclear technology. Muon tomography has potential applications in nuclear anti-proliferation efforts and this patent application therefore has potential value in national defense.

Embodiment 5

Figure 4:
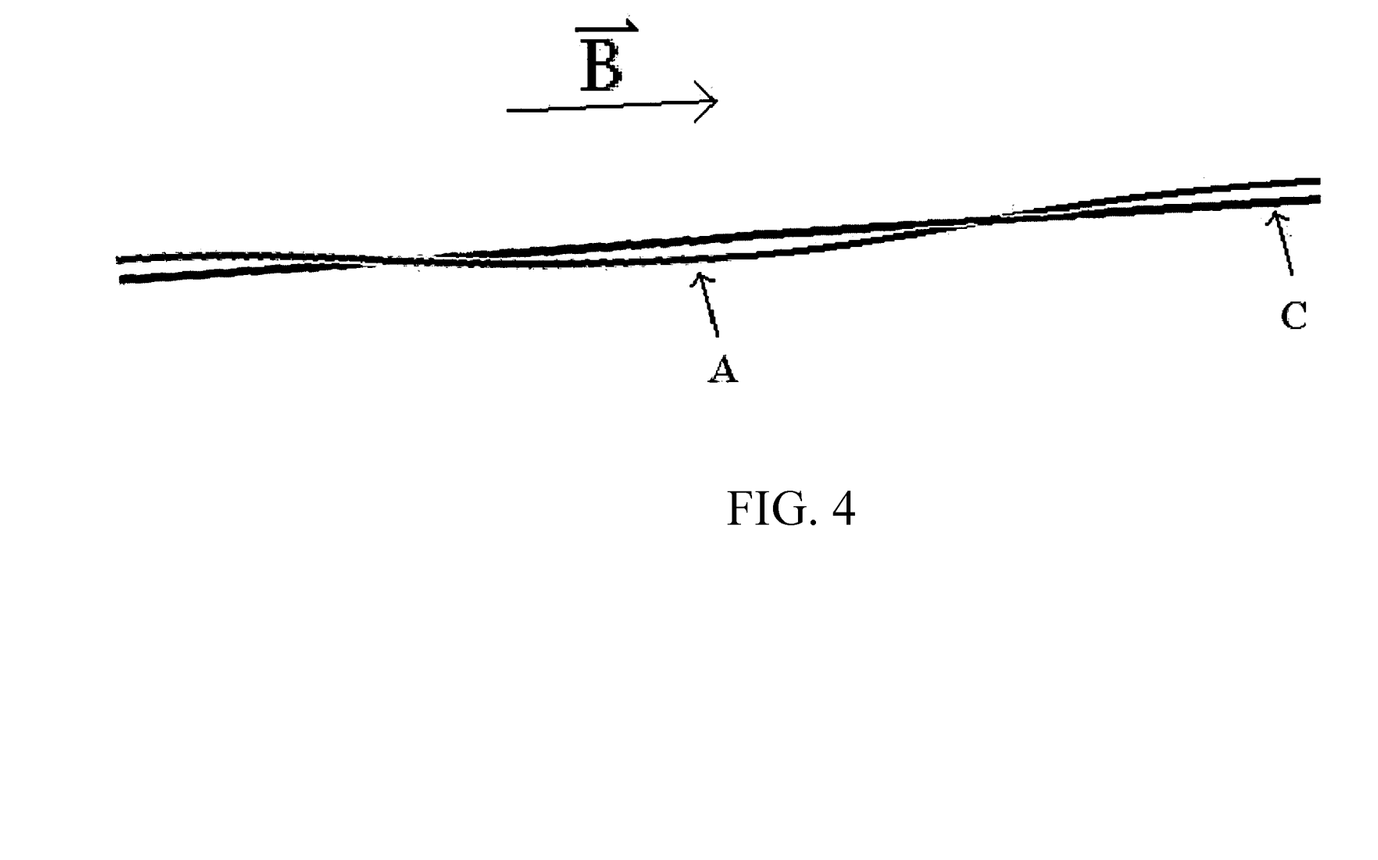
FIG. 4 is a schematic representation of an example directional luminosity discriminator in a magnetic field according to the invention.

In FIG. 4, a simple drawing Embodiment 4 is illustrated. A represents the entire DLD device, but notably with the column (1) and reflector (2) coiled into a helical shape in order to match or mimic the path of a charged particle of specific energy and magnetic rigidity which is subjected to a pervading, externally produced magnetic field, B (shown here, not necessarily, as a constant field). The resultant particle path is a non-linear, geodesic path, such as a helix as in FIG. 4, with a radius of curvature proportional to the strength of the magnetic field, and to both the momentum and to the charge of the particle. C is a straight path line, shown here for reference, along which the charged particle would otherwise travel were the magnetic field not present.

During a particle detection event (which, for a DLD with a column meters in length, takes only nanoseconds), the shape of the column (1) will remain constant. However, a flexible column (1) and reflector (2) material (such as, for example, a fiber optic scintillator or a flexible tube filled with water) will allow the column (1) and reflector (2) to take different shapes as desired, successively, changing the radius of curvature in the helix in order to select for particles of different magnetic rigidities. Alternatively or concurrently, the magnitude or direction or nature of the magnetic field B may be changed for similar energetic-discriminatory effect.

As in the other embodiments of the present novel means for directional discrimination (namely DLD), the angular deviation of the charged particle from the longitudinal axis of the column (1) is discerned from a counting of the number of photons produced in the event in this Embodiment 5.

The invention claimed is:

1. A device for measuring the magnetic rigidity of penetrating charged particles, said device comprising:
    an elongate transparent ionizable medium extending along a helical path around a longitudinal axis, said medium being surrounded by a reflective interface;
    a magnet adapted to apply a magnetic field to said medium in a direction along said longitudinal axis;
    a single luminosity proportional photon detector operationally associated with said medium and adapted to generate signals indicative of a number of photons transiting said medium;
    a controller adapted to receive said signals and calculate a penetration depth of said ionizing particle through said medium based upon said number of photons transiting said medium and a magnetic rigidity of said charged particle based upon said penetration depth.

2. The device according to claim 1, wherein said ionizable medium comprises distilled water.

3. The device according to claim 2, wherein said ionizable medium is contained within a helical tube.

4. The device according to claim 3, wherein said tube is flexible.

5. The device according to claim 1, wherein said medium comprises a fiber optic scintillator.

6. A method for measuring the magnetic rigidity of penetrating charged particles, said method comprising:
    providing an elongate transparent ionizable medium extending along a helical path around a longitudinal axis, said medium being surrounded by a reflective interface;
    applying a magnetic field to said medium in a direction along said longitudinal axis;
    providing a single luminosity proportional photon detector operationally associated with said medium and adapted to generate signals indicative of a number of photons transiting said medium;
    providing a controller adapted to receive said signals;
    allowing an ionizing particle to pass through said medium, thereby creating photons therein, said photons transiting said medium;
    counting the number of photons transiting said medium using only said single photon detector, said single photon detector generating said signals indicative of said number of photons transiting said medium;
    calculating a penetration depth of said ionizing particle through said medium based upon said number of photons transiting said medium using said controller; and
    calculating, in the absence of temporal coincidence, a magnetic rigidity of said charged particle based upon said penetration depth using said controller.

* * * * *